(12) United States Patent
Richter et al.

(10) Patent No.: US 9,266,605 B2
(45) Date of Patent: Feb. 23, 2016

(54) AIRCRAFT HAVING A VERTICAL LIFT SYSTEM

(75) Inventors: Martin Richter, Bremen (DE); Peter Lücken, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/322,486

(22) PCT Filed: May 26, 2010

(86) PCT No.: PCT/EP2010/003196
§ 371 (c)(1),
(2), (4) Date: Feb. 12, 2012

(87) PCT Pub. No.: WO2010/136188
PCT Pub. Date: Dec. 2, 2010

(65) Prior Publication Data
US 2012/0138751 A1 Jun. 7, 2012

Related U.S. Application Data (60) Provisional application No. 61/180,962, filed on May 26, 2009.

(30) Foreign Application Priority Data

May 26, 2009 (DE) .......................... 10 2009 022 602

(51) Int. Cl.
*B64C 13/00* (2006.01)
*B64C 13/50* (2006.01)
*B64D 45/00* (2006.01)

(52) U.S. Cl.
CPC .......... *B64C 13/503* (2013.01); *B64D 45/0005* (2013.01); *B64D 2045/001* (2013.01)

(58) Field of Classification Search
CPC ...................................................... Y02T 50/44
USPC ............... 244/99.2, 99.4, 194, 195, 220, 221
See application file for complete search history.

(56) References Cited

U.S. PATENT DOCUMENTS 4,422,180 A * 12/1983 Wendt ........................... 398/110
4,649,484 A * 3/1987 Herzog et al. .................... 701/3
(Continued)

FOREIGN PATENT DOCUMENTS

| CN | 1 882 474 | 12/2006 |
|----|-----------|---------|
| EP | 1 462 361 | 9/2004 |

(Continued)

OTHER PUBLICATIONS

International Search Report for Application U.S. Appl. No. PCT/EP2010/003196 dated Sep. 3, 2010.
(Continued)

*Primary Examiner* — Brian M O'Hara
*Assistant Examiner* — Keith L Dixon
(74) *Attorney, Agent, or Firm* — Jenkins, Wilson, Taylor & Hunt, P.A.

(57) ABSTRACT

An aircraft having a high lift system, including a control computer, high lift bodies on each wing, a drive coupled to these, an activation device connected to the drive via an analog connection, an input device, and sensors detecting a state of the high lift bodies connected via analog lines to the activation device. The input device connects via a digital connection to the activation device for transmitting commands for adjusting the high lift bodies. The activation device is installed in the payload area of the fuselage and in an area extending from a location spaced from the front of the wingbox by a distance of one third of the fuselage length extending from there to the aircraft's tip, as far as a location spaced from the rear of the wingbox by a distance of one third of the fuselage length extending from there to the aircraft's tail end.

7 Claims, 4 Drawing Sheets

(56) References Cited

U.S. PATENT DOCUMENTS

| | | | |
|---|---|---|---|
| 5,025,199 A * | 6/1991 | Ako | 318/561 |
| 5,531,402 A * | 7/1996 | Dahl | 244/99.2 |
| 6,181,989 B1 * | 1/2001 | Gwozdecki | 701/4 |
| 7,017,861 B1 * | 3/2006 | Johansson et al. | 244/194 |
| 7,556,224 B2 * | 7/2009 | Johnson et al. | 244/175 |
| 7,770,842 B2 * | 8/2010 | Benson | 244/75.1 |
| 7,878,461 B2 * | 2/2011 | Hirvonen et al. | 244/223 |
| 8,033,509 B2 * | 10/2011 | Yount et al. | 244/194 |
| 8,104,720 B2 * | 1/2012 | Hirvonen et al. | 244/194 |
| 8,335,600 B2 * | 12/2012 | Breit et al. | 701/3 |
| 2005/0151027 A1 | 7/2005 | Recksiek et al. | |
| 2006/0043242 A1 | 3/2006 | Benson | |
| 2007/0145180 A1 | 6/2007 | Johnson et al. | |
| 2008/0142642 A1 | 6/2008 | Marino | |
| 2008/0245925 A1 | 10/2008 | Udall | |

FOREIGN PATENT DOCUMENTS

| | | |
|---|---|---|
| RU | 2 346 851 | 2/2009 |
| WO | WO 2006/120312 | 11/2006 |
| WO | WO 2008/091424 | 7/2008 |

OTHER PUBLICATIONS

International Preliminary Report on Patentability and Written Opinion for Application Serial No. PCT/EP2010/003196 dated Dec. 16, 2011.

German Office Action for Application No. 10 2009 022 602.8 dated Jan. 14, 2013.

Russian Decision to Grant for Application No. 2011152486/11(078769) dated Mar. 26, 2013.

Chinese Search Report for Application No. 2010 800 286 28.2 dated May 26, 2010.

Chinese Office Action for Application No. 2010 800 286 28.2 dated Nov. 4, 2013.

* cited by examiner

AIRCRAFT HAVING A VERTICAL LIFT SYSTEM

RELATED APPLICATIONS

The present application is a national stage entry according to 35 U.S.C. §371 of PCT application No.: PCT/EP2010/003196 filed on 26 May 2010, which claims priority from German Application No. 10 2009 022 602.8, filed on 26 May 2009, and from U.S. Provisional Application No. 61/180,962, filed on 26 May 2009, the entire disclosures of which are incorporated herein by reference.

TECHNICAL FIELD

The invention relates to an aircraft having a high lift system.

BACKGROUND

From the general prior art it is known to activate and monitor drive mechanisms of adjustable lift bodies or flaps such as, e.g., landing flaps or slats of high lift systems of modern civil as well as military transport planes through central digital computers. These are located, together with other computers such as the flight control computers or maintenance computers, in the board calculator cabinets in a so-called avionics bay positioned in the vicinity of the aircraft's cockpit. In consequence, particularly the safety-sensitive aircraft computers are accommodated inside one room while being air-conditioned and supplied with electric power in a uniform manner. The accommodation of the named computers in one and the same avionics bay or in a single accommodation space presents the advantage of uniform atmospheric conditions—which create the technical preconditions for observing the failure rate of these computers, for instance—having to be established for the single accommodation space only.

Accordingly, all of the components of the high lift system external of the avionics bay are connected via analog signal connections to the activation computer thereof. Thus, e.g., the drive motors of the high lift systems provided for adjusting the landing flaps or leading edge flaps (slats), the operating lever (slat/flap levers), as well as the sensors for component and system monitoring are functionally connected via analog signal connections to the activation computer for activation the landing flaps and locking brakes. In this way it is ensured that the functional demands to the high lift system and particularly to the activation computer thereof are met, for the activation and monitoring signals are transmitted immediately and thus at a minimal time delay between the input device of the high lift system such as the operating lever, for example, and the activation computer of the high lift system as well as between the activation computer and the drive motors or the drive device of the high lift system. The described use of analog signal transmission lines particularly results in advantages with regard to the realization of a safety concept, for hereby the delay time or dead time between the occurrence of a fault and its recognition and corresponding functional reactions in the activation device, such as triggering the locking and safety brakes is minimized, and in the event of a fault the reconfiguration of the high lift system may therefore be carried out within a comparatively short time period.

SUMMARY

Various embodiments of the invention provide an aircraft having a high lift system whereby the safety demands to the aircraft may be met in an efficient and economic manner.

In accordance with the invention an aircraft having a high lift system is provided which comprises:
- a flight management system comprising a flight management computer which is installed, e.g., in the avionics bay of the aircraft,
- at least one high lift body disposed on each respective wing of the aircraft so as to be adjustable relative to the latter, a drive device coupled with the high lift bodies which is implemented such that it adjusts the high lift bodies between a retracted position and an extended position on the basis of activation commands, and
- at least one high lift system computer or an activation device connected to the drive device via an analog data connection and including an activation function for generating activation commands for setting the adjustment state of the high lift bodies.

The activation device comprises a digital interface for the connection thereof to the flight management computer in order to receive flight state-related data from the latter. The activation device includes a function which, by using the flight state-related data, generates activation commands to be transmitted to the activation device for actuating the respective associated activation device in order to adjust the high lift bodies as well as monitoring and locking commands for actuating brakes of the respective associated activation device in order to lock the high lift bodies in the event of a system failure, and transmits these commands to the activation device. The event of a system failure may, for example, be the failure of an adjusting mechanism due, e.g., to the breakage of a central transmission shaft. The flight state-related data is data determined with the aid of sensors and relating to, or derived from, the flight state of the aircraft, or may be flight state data, i.e. data describing the flight state. Flight condition-related data that is used in particular are the current aircraft speed, the angle of attack of the aircraft, the height above ground.

The aircraft or high lift system of an aircraft provided in accordance with the invention further comprises an input device for inputting target commands for adjusting the high lift bodies, which is connected to the activation device for the transmission of target commands to the latter for adjusting the high lift bodies. The activation device includes a function which generates activation commands for transmission to the activation device by using the target commands received from the input device as well as flight state-related data for adjusting the high lift bodies, and transmits them to the activation device. In the high lift system of the invention, the flight management system may equally include a function realized in particular as a safety function whereby the activation device is actuated, e.g., in order to retract high lift bodies.

The aircraft provided in accordance with the invention further comprises sensors for detecting an adjustment state of the high lift bodies which are connected via analog signal lines to the activation device for checking or monitoring the adjustment state of the high lift bodies and/or the operativeness of the high lift system.

In accordance with the solution of the invention it is provided in particular
  that the input device is connected via a digital data connection to the activation device for the transmission of target commands for adjusting the high lift bodies, and
  that the activation device is installed in the payload area of the aircraft's fuselage.

According to one practical example of the invention, the activation device of the high lift system is installed in the payload area of the aircraft's fuselage and in an area extending, when viewed in the longitudinal direction of the fuselage, from a location which is spaced apart from the front side of the wingbox by a distance of one third of the fuselage length extending from there to the tip of the aircraft, as far as a location which is spaced apart from the rear side of the wingbox by a distance of one third of the fuselage length extending from there to the fuselage end at the tail end of the aircraft.

According to one practical example in accordance with the invention it is provided that the high lift system is a leading edge lift system having adjustable leading edge lift bodies and an activation device, wherein the activation device of the leading edge lift system is functionally connected to the latter for adjusting them.

Here it may be provided in particular that the activation device of the leading edge lift system is installed in the payload area of the aircraft's fuselage and in an area extending, when viewed in the longitudinal direction of the fuselage, from the front side of the wingbox to a location which is spaced apart from the front side of the wingbox by a distance of one third of the fuselage length extending from there to the tip of the aircraft.

According to one practical example of the invention it is provided that the high lift system is a trailing edge lift system having adjustable trailing edge lift bodies and an activation device, wherein the activation device of the trailing edge lift system is functionally connected to the latter for adjusting them.

Here it may be provided in particular that the activation device of the trailing edge lift system is installed in the payload area of the aircraft's fuselage and in an area extending, when viewed in the longitudinal direction of the fuselage, from the rear side of the wingbox to a location which is spaced apart from the rear side of the wingbox by a distance of one third of the fuselage length extending from there to the tail end.

The solution in accordance with the invention provides to alter the usual joint arrangement of flight control computers with high lift system computers, notwithstanding the fact that the existing safety demands to the aircraft and the related approval procedures are under the assumption of a central arrangement of these computers. In comparison with the usual arrangement of the calculators, accommodating the high lift system computers or the activation device in the payload area of the aircraft's fuselage does away with a major part of the cable lengths for analog control and monitoring signals for bridging the distance between cockpit (or avionics bay) and wing.

It is true that the association of the input device via a digital data connection to the activation device of the high lift system for the transmission of target commands for adjusting the high lift bodies as provided in accordance with the invention increases the expenditure for interfaces at the input device for the conversion of sensor signals corresponding to the actuating movements into digital data and reduces the functional performance particularly with regard to the transmission speed or transmission interval of the connection between the input device and the activation device, for such digital input data is transmitted via the aircraft data transmission bus in the framework of a predetermined transmission protocol. But these dispositions equally bring about savings of analog cables for analog signal transmission from the input device to the activation device. As regards the transmission of data, time windows and iteration rates for feeding the input data from the input device into the data bus are provided in accordance with the invention which result in a time delay that is still admissible. Here it is necessary to harmonize the transmission of the data from the input device with the transmission of the further data to be transmitted via the data bus while observing the respective temporal conditions.

In accordance with the invention, particularly the at least one activation device of the high lift system may be formed of respective computers and hardware interfaces which are implemented in their hardware so as to be compatible and particularly identical with each other, in order to ensure an exchangeability of computers with hardware interfaces between activation devices and/or within activation devices. In the hardware interfaces, particularly the electric power slots or the signal connection slots are implemented so as to be compatible or identical with each other, so that identical connector types for connecting the respective provided signal and/or data connections may be plugged in. The hardware interfaces are then realized so as to be compatible or identical with each other particularly for establishing the data connections with flight control computer 51 and/or with the respective associated drive device.

What is provided in particular in accordance with the invention is an aircraft having features in accordance with the invention which comprises a rear drive because in this case the savings of cable lengths may be improved further, for on account of the heaviness of the tail due to the arrangement of engines at the fuselage end, the wings are arranged comparatively far to the rear on the fuselage.

On the one hand, the invention is based on the idea of positioning the activation device of the high lift system, i.e. the control and monitoring calculators or checking calculators as closely as possible to the plurality of the components of the high lift system that are to be controlled and monitored, i.e. of the leading edge lift system or slat system located on the wing leading edge, and/or as closely as possible to the system components of the trailing edge lift system or flap system located on the wing trailing edge. With regard to reliability and accessibility, on the other hand, the environmental and installation conditions for the respective activation device are similar to the environmental and installation conditions prevailing in the classical board calculator cabinet or avionics bay. With the solution in accordance with the invention it is furthermore possible to attain the demanded degree of fail-safe operation of the high lift system without additional expenditure in comparison with the arrangement known from the prior art wherein the high lift computers are arranged in the board calculator cabinet in the vicinity of the cockpit.

The arrangement of the activation device in the aircraft may accordingly also be termed local or decentralized. Relative to the high lift system proper, the arrangement of the activation device may be perceived, particularly under a functional aspect, as a central structure presenting advantages with regard to complete and rapid system monitoring especially in drive systems comprising a central drive mechanism, a continuous rotary shaft train, and local mechanical actuator means at the support stations (tracks). These central drive systems are characterized by high system dynamics in the event of faults (e.g., breakage of rotary shaft) and require rapid failure recognition and corrective response and thus fast signal transmission and high sampling rates of the checking algorithms within the checking calculators.

According to a further practical example, the at least one activation device of the high lift system is situated in an area of the aircraft's fuselage extending, when viewed in the longitudinal direction of the aircraft, from a forward point located by one wing connection length to the front of the most forward point of the wing connection range or of the wingbox to a rearward point of the wing connection range located by one wing connection length to the rear of the most rearward point of the wing connection range. "Wing connection length" presently is understood to be the length across which the wing connection range, i.e., the range of intersection of wing profile outer skin and fuselage outer skin, extends in the longitudinal direction of the fuselage.

According to one practical example of the invention, the high lift system is a leading edge lift system having adjustable leading edge lift bodies, wherein the activation device for adjusting the latter is functionally connected to them. In this case the activation device of the leading edge lift system may particularly be located to the front of the wing connection range when viewed in the longitudinal direction of the aircraft.

According to one practical example of the invention, the high lift system alternatively or additionally comprises a trailing edge lift system having adjustable trailing edge lift bodies, wherein the activation device for adjusting the latter is functionally connected to them. In this case the activation device of the trailing edge lift system may particularly be located to the rear of the wing connection range when viewed in the longitudinal direction of the aircraft.

In one practical example the activation device for the leading edge lift system having two checking calculators is installed in the fuselage area a short distance to the front of the wingbox, and the activation device for the trailing edge lift system having two checking calculators is installed, also in the fuselage area, a short distance to the rear of the wingbox. This arrangement brings about a shortening of the distances between the checking calculators and the electric components of the respective drive device such as drive motors, locking brakes, as well as position and failure recognition sensors. The interfaces for activation and monitoring of the leading edge lift system and/or trailing edge lift systems are analog interfaces, so that no ND or D/A conversion is required for the electric components of the respective drive system. The electric components of the respective drive system accordingly do not require any electronic integrated components, processors, etc.

As, in accordance with the invention, the input device or the operating lever for the target specifications to the leading edge lift system and/or the trailing edge lift system is connected via a digital data connection to the activation device for the transmission of target commands for adjusting the high lift bodies, the respective different position signals of the input device or of the operating lever such as, e.g., "0", "1", "2", . . . , or "Full" are digitized by means of A/D interface and sent to the checking calculator of the leading edge lift system and/or of the trailing edge lift system via digital lines in the form of digital information. This A/D conversion may take place both in the input device or in the operating lever, or alternatively externally thereof, i.e. on the signal path between the input device or the operating lever and the aircraft data bus or particularly the digital collection and distribution point (switch) thereof by means of a separate electronic unit. In particular it is moreover provided to exchange the signals from and to other systems in a purely digital form via the same digital network including the checking calculators of the leading edge lift system and/or the trailing edge lift system.

In accordance with the invention, the data or the signals from and to the cockpit or the closer vicinity of the cockpit are in this way, following their digitization, transmitted digitally to the respective activation device of the high lift system. Accordingly the relatively long distance between cockpit area and wing is bridged by means of a digital data bus, whereas the actual checking and monitoring of the respective mechanical adjusting device of the high lift system continues to be carried out by means of analog interfaces and analog signals.

One advantage of the invention resides in the fact that due to the shift of the activation device, i.e. of the checking calculator of the high lift system, from the avionics bay in the forward area of the aircraft to an area located near the plurality of system components to be activated and monitored by means of the activation device, the quantity and the weight of the cables for the transmission of the analog signals (voltages, currents) between the activation device and the corresponding components of the high lift system, i.e. the landing flap system and/or the wing leading edge body system, are reduced significantly. This feature of the solution in accordance with the invention is advantageous particularly in the case of aircraft having their engines arranged at the fuselage end, for in these aircraft the wings are arranged comparatively far to the rear in the longitudinal extension of the aircraft on account of the rearward arrangement of the engines in the longitudinal direction of the aircraft and the resulting heaviness of the tail of the aircraft.

In the solution in accordance with the invention, data being processed in functions in the respective activation device of the high lift system and requiring a lower processing speed at a low sampling rate than for the signals for commanding the respective drive device of the high lift system are transmitted to the activation device via a digital data connection or a digital bus. Such data transmitted via a digital data connection includes the target commands generated by the input device through the actuation thereof for adjusting the high lift bodies. Optionally, such data also includes data received from further systems of the aircraft or transmitted to these. Information or signal values requiring a high processing speed at a high sampling rate for their processing in the activation device are transmitted via an analog data connection to the respective drive device of the high lift system, connection As a matter of fact, the association of the input device and, e.g., an actuation lever to the activation device via a digital data connection necessitates the provision of ND signal conversion and a further digital data connection interface at the activation device. On the other hand, the advantages obtained in accordance with the invention by saving cable lengths of the analog signal lines between the input device and the activation device together with the savings of cable lengths of the analog signal lines in the functional connection of the activation device to the components or sensors for detecting an adjustment state of the high lift bodies are suited to bring about a system improvement in a total view. Besides the reduction of cable lengths of the analog lines, however, the number of analog connections of the high lift system is also reduced in accordance with the invention. Hereby the expenditure for integration of the high lift system may be improved, and during assembly particularly weight and the installation expenditure may be reduced by the reduction of the cable lengths.

Replacing the analog data transmission of the flap lever signal (target position for the landing flaps) to the checking calculators with a digital data transmission inherently reduces the number of the cables for this interface. Where it is possible in many instances to jointly use previously existing digital networks for the digital signals (flap lever signals, signals from and to other systems), it is possible to partly or entirely do away with dedicated cabling for these components. This results in further savings effects in regard of aircraft cabling and cable weight.

In accordance with the invention, the at least one activation device is arranged in a payload area, i.e., the cargo bay in the fuselage in which air-conditioning exists which may be different from the air-conditioning in the electronics bay arranged in the forward area of the fuselage, but which are provided such that they may satisfy the demands to failure rate and fail-safe operation if the electric and electronic components of the at least one activation device are implemented accordingly.

Considering these advantages that are attainable in accordance with the invention, the high lift system provided in accordance with the invention may be used with a usual drive system, so that the latter may in particular be equipped with simple, robust sensors and with simple, sturdy electric switching valves or servo valves in the absence of complex local processor units. Such simple and robust sensors and simple, sturdy electric switching valves and servo valves are components which are capable of meeting the functional and safety demands to them even in installation locations with harsh environmental conditions prevailing in the wing or wing leading edge or wing trailing edge, i.e. installation locations exposed to great variations with regard to temperature, humidity, pressure, and electromagnetic interferences.

According to one practical example of the invention, the same sensors are used both for the leading edge lift system and for the trailing edge lift system to monitor them, and the activation device for the leading edge lift system and the activation device for the trailing edge lift system comprise identical interfaces for the drive motors of the drive device. In this practical example it is moreover provided that the electric power slots for receiving the activation device of the leading edge lift system and the electric power slots for receiving the activation device of the trailing edge lift system are configured such as to be compatible both for receiving the activation device of the leading edge lift system and for receiving the activation device of the trailing edge lift system. "Electric power slots" should in this context be understood to be the slot arrangement, i.e. particularly the arrangement of the electric plug-in contacts.

As a result, the same checking calculator or checking computer types or calculator designs may be used for the activation device both of the leading edge lift system and of the trailing edge lift system. If two computers for the activation device of the leading edge lift system and furthermore two computers for the activation device of the trailing edge lift system are provided in a practical example of the invention, all four checking calculators may be constructed identically in their hardware and optionally in their interfaces, and may particularly be provided with a same device identification. This disposition brings about the advantage that in this practical example it is possible to use one checking calculator design for four identically realized electric power slots, i.e. two checking calculators for the leading edge lift system and two checking calculators for the trailing edge lift system each being of a same design. Hereby the costs for procurement and stocking of the calculators may be reduced. In addition this results in higher flexibility with regard to the availability of apparatuses and particularly of checking calculators for the aircraft operator in the event of failure of a checking calculator or even in the event of failure of both checking calculators of the leading edge lift system or both checking calculators of the trailing edge lift system.

According to a further practical example, the checking calculators of the leading edge lift system are configured to be exchangeable with the checking calculators of the trailing edge lift system, so that in the event of a failure of both checking calculators of the leading edge lift system or of the trailing edge lift system, one of these failed checking calculators may be replaced with one of the two still operable checking calculators of the respective other lift system, i.e. of the trailing edge lift system or of the leading edge lift system. Thus the system availability may be restored by simply exchanging the respective checking calculators. This results in higher flexibility of the aircraft operator during a aircraft operation under reduced apparatus availability.

BRIEF DESCRIPTION OF THE DRAWINGS

In the following description, practical examples of the invention are described by making reference to the annexed figures, wherein.

DESCRIPTION

Figure 1:
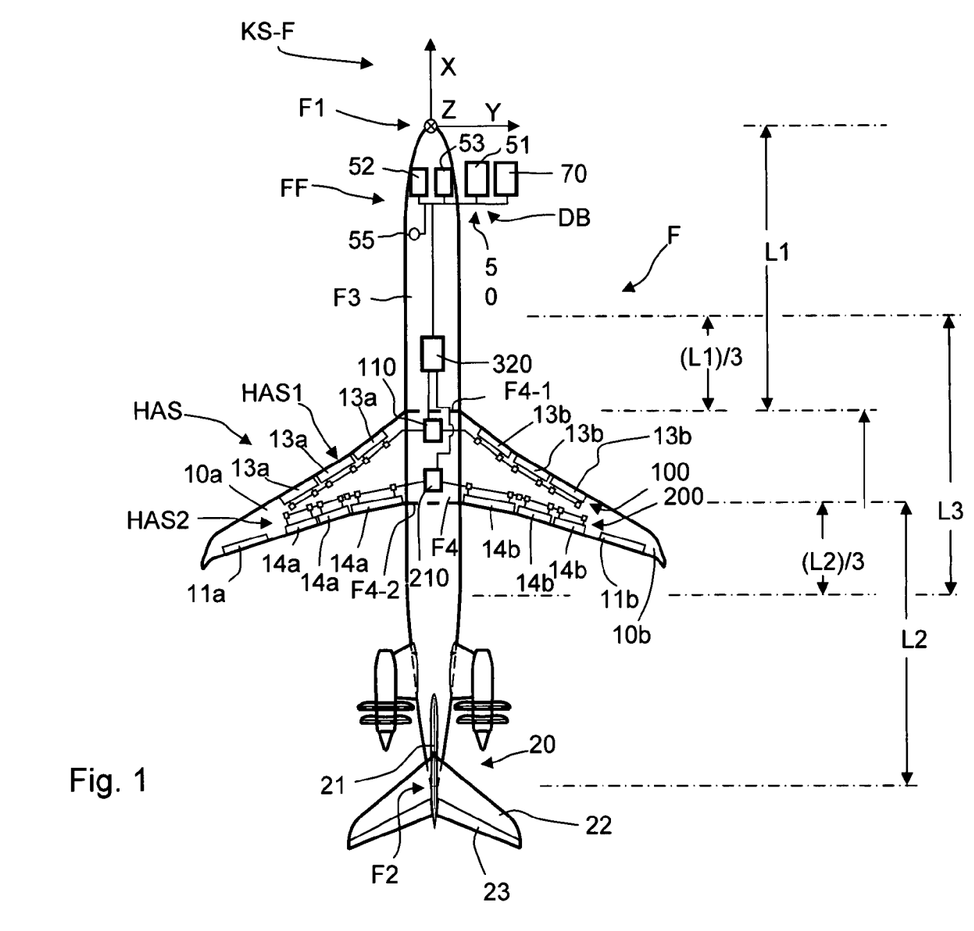
FIG. 1 is a schematic representation of an aircraft with a functional representation of an embodiment of the high lift system provided in accordance with the invention which comprises a leading edge lift system and a trailing edge lift system, and of further aircraft systems disposed on board the aircraft.

In the aircraft F schematically represented in FIG. 1, a functional representation of a practical example of the high lift system HAS provided in accordance with the invention and comprising a leading edge lift system HAS1 and a trailing edge lift system HAS2 is drawn in. In accordance with the invention the aircraft F may comprise a leading edge lift system HAS1 and/or a trailing edge lift system HAS2. The leading edge lift system HAS1 is generally provided for adjusting at least one leading edge lift body that may be a slat or a leading edge flap. The trailing edge lift system HAS2 is provided for adjusting at least one trailing edge lift body that may be a landing flap or a flap adapted to rotate on the wing.

The high lift system of the invention shown in the functional representations of embodiments in FIGS. 1 to 4 is provided on each wing for adjusting at least one trailing edge lift body or a landing flap and/or a leading edge lift body or a slat.

The practical example of a controlled aircraft F as shown in FIG. 1 comprises two wings 10a, 10b each having at least one aileron 11a or 11b. On each wing 10a, 10b the aircraft furthermore comprises three respective leading edge lift bodies 13a, 13b and three trailing edge lift bodies 14a, 14b. Optionally the wings 10a, 10b may each comprise a plurality of spoilers that are not represented in FIG. 1. In FIG. 1 a coordinate system relative to the aircraft F is drawn in, which includes a longitudinal aircraft axis X, a lateral aircraft axis Y, and a vertical aircraft axis Z.

Furthermore the aircraft F comprises a tail unit 20 comprising a rudder unit 21 and an elevator unit 22 each comprising at least one elevator 23. The elevator unit 22 may be configured, e.g., as a T-shaped tail as represented in FIG. 1, or as a cruciform tail unit.

The aircraft F of the invention may also have a shape different from the aircraft F represented in FIG. 1. By way of example, the aircraft of the invention may also be a high wing aircraft or an all-wing type aircraft. The aircraft may furthermore be an aircraft having canards instead of an elevator unit.

The device for influencing the directional stability of the aircraft F provided in accordance with the invention comprises a control input device arranged in the cockpit of the aircraft for inputting control specifications for the flight path control of the aircraft (not represented in the figures), which may in particular comprise pilot input means such as a control stick and optionally also pedals, and a flight control device 50 comprising a flight control computer 51 which is functionally communicated with the control input device particularly for the flight path control of the aircraft F.

The aircraft F further comprises a sensor device with air data sensor device 52 functionally communicated with the flight control device 50 for the detection of flight state data for determining the flight state, as well as inertial sensor device 53 for the detection of a flight state of the aircraft F and particularly the rotary rates of the aircraft F, which form part of the flight management system FF of the aircraft F. The function modules or computers of the FF and particularly the sensor devices may be implemented to be multiple redundant in order to ensure a demanded degree of fail-safe operation. The air data sensor device 52 comprises air data sensors for determining the flight state of the aircraft F and particularly the dynamic pressure, the static pressure, and the temperature of the air flowing along the aircraft F. The inertial sensor device 53 particularly serves to determine rotary rates of the aircraft F, including the yaw rates and the roll rates of the aircraft for determining its attitude. The flight control device 50 comprises a reception device for receiving the sensor values detected by the sensor device, which are transmitted by the latter to the flight control device 50.

To the respective control flaps present on the aircraft such as, e.g., the ailerons 11a, 11b, the spoilers 12a and 12b, at least one actuator drive and/or one drive device is associated, each of which is activated by the flight control device 50 by means of command signals which are target commands in order to adjust the respective associated control flaps for controlling the aircraft F. Here it may provided that a respective actuator drive is associated to each one of these control flaps, or a plurality of actuator drives in order to enhance the degree of fail-safe operation of the aircraft system.

The flight control device 50 includes a control function which receives control commands from the control input device, and sensor values and in particular rotary rates detected by the sensor device from the sensor device. The control function is implemented such that in dependence on the control commands and the detected and received rotary rates it generates actuating commands for the actuator drives and transmits them to the latter, so that a control of the aircraft F in accordance with the control commands is effected by operating the actuator drives.

The flight control device 50 may particularly be connected via a digital data bus DB to the air data sensor device 52 and the inertial sensor device 53.

In addition to the flight control device 50 and the sensor device, further aircraft system modules symbolically represented in the figures by a functional block 70 may be interconnected through the data bus or a data bus system DB. Further aircraft system modules may, for example, be a flight management system or a maintenance system.

In addition the aircraft F comprises a high lift system HAS having respective slats 13a, 13b and/or trailing edge flaps 14a, 14b provided on the aircraft and each movably coupled with the wings by means of an adjusting mechanism 100 or 200 while being driven by a respective drive device 110 or 210. In the practical example represented in FIG. 1, the drive devices 110, 210 are driven by an activation device 320. For the purpose of adjusting the slats 13a, 13b and/or trailing edge flaps 14a, 14b an input device 55 for inputting target commands for adjusting the high lift body/bodies 13a, 13b, 14a, 14b is arranged in the cockpit of the aircraft F. In accordance with the invention, the input device 55 is functionally connected via a digital data bus DB to the activation device 320.

Figure 2:
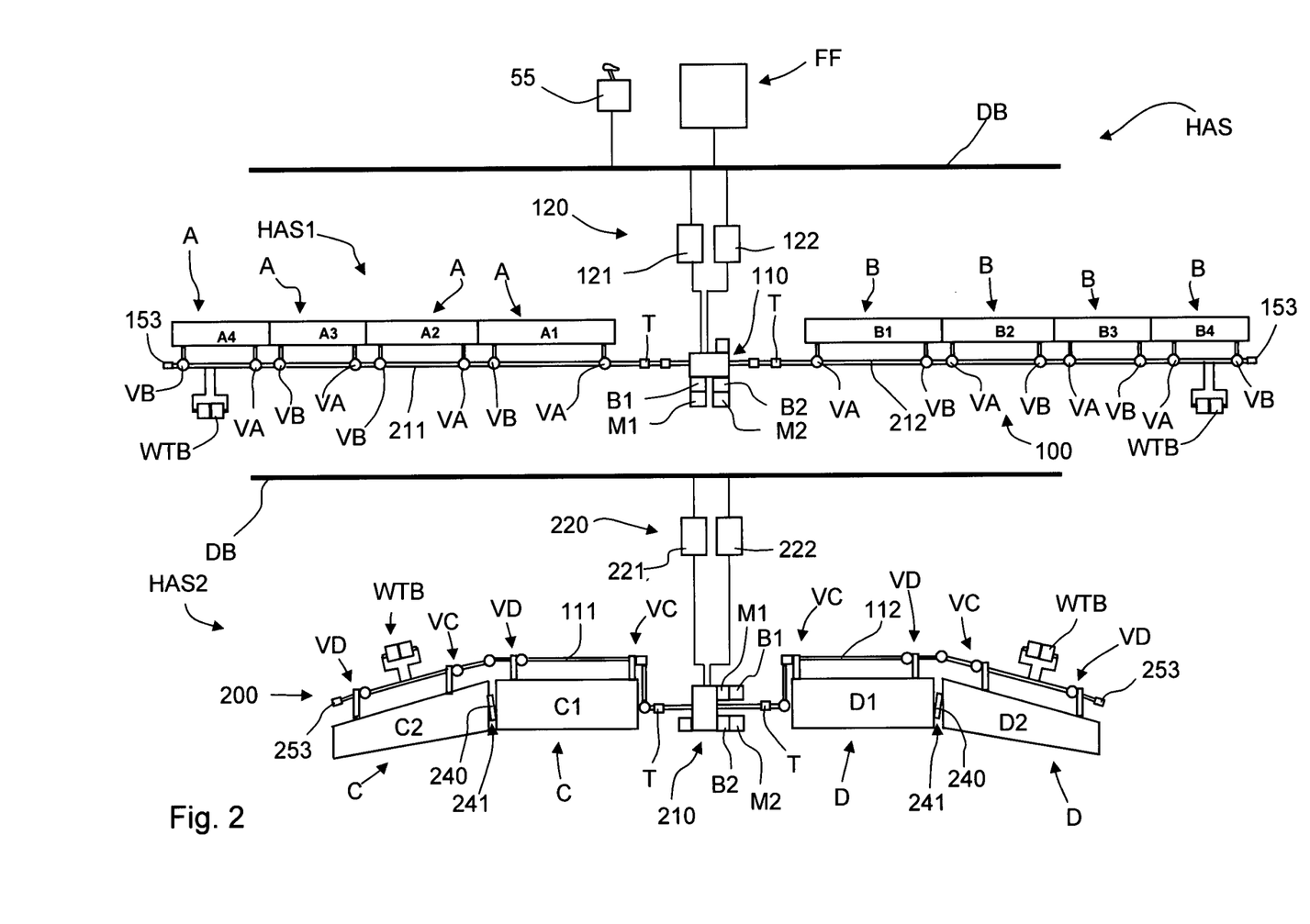
FIG. 2 is a functional representation of another practical example of the high lift system for adjusting high lift flaps as provided in accordance with the invention which comprises a leading edge lift system and a trailing edge lift system each comprising one drive device.

In FIG. 2 a practical example of a high lift system comprising a leading edge lift system HAS1 and a trailing edge lift system HAS2 is represented, which shall be described in the following:

The leading edge lift system HAS1 represented in FIG. 2 comprises:
  four leading edge lift bodies A1, A2, A3, A4 or B1, B2, B3, B4 per wing (not shown in the representation of FIG. 1), of which the leading edge lift bodies A1, A2, A3, A4 are arranged on a first wing 10a and the leading edge lift bodies B1, B2, B3, B4 on a second wing 10b so as to be adjustable relative thereto;
  an adjusting mechanism 100 mechanically coupled with the leading edge lift bodies for adjusting them;
  a leading edge lift system drive device 110 coupled with the adjusting mechanism 100 for actuating the adjusting mechanism 100 on the basis of received adjustment commands;
  a leading edge lift system activation device 120 containing an activation function which generates adjustment commands for adjusting the leading edge lift bodies on the basis of inputs and particularly of target commands and transmits these to the leading edge lift system drive device 110 for actuating the adjusting mechanism 100.

In the high lift system of the invention HAS there is generally also the possibility of less or more than four leading edge lift bodies per wing being provided.

In FIG. 2 the leading edge lift bodies A1, A2, A3, A4 of the left wing 10a when viewed in the aircraft's longitudinal direction are also conformingly provided with reference symbol A, and the leading edge lift bodies B1, B2, B3, B4 of the right wing 10b are also conformingly provided with reference symbol B.

The activation device 120 of the leading edge lift system HAS1 may be implemented to be multiple redundant to enhance the degree of fail-safe operation. For this purpose, two specimens 121, 122 of an activation device 120 may be provided in accordance with the representation in FIG. 2, which are identical in a certain regard or entirely identical and are connected to each other into a whole via a data connection for mutual monitoring and optionally for reconfiguration of the activation device 120.

In accordance with the invention, the activation device 120 of the leading edge lift system HAS1 is generally installed in the payload area of the aircraft's fuselage F3 and in an area L3 which extends, when viewed along the longitudinal direction X, from a location which is spaced apart from the front side F4-1 of the wingbox F4 by a distance of one third of the fuselage length L1 extending from there to the tip F1 of the aircraft in a direction toward the front tip F1 of the aircraft F, as far as a location which is spaced apart from the rear side F4-2 of the wingbox F4 by a third of the fuselage length L2 extending from there to the fuselage end F2 at the tail end of the aircraft F in a direction toward the fuselage end F2 at the tail end of the aircraft F. The installation area thus resulting in the longitudinal direction X is entered in FIG. 1 with the designation of length L3.

According to a special practical example of the invention, the activation device 120 of the leading edge lift system HAS1 is installed in the payload area and in an area of the aircraft's fuselage F3 extending from the front side F4-1 of the wingbox F4 as far as a location which is spaced apart from the front side F4-1 of the wingbox F4 by a distance of one third of the fuselage length L1 extending from there to the tip F1 of the aircraft in a direction toward the front tip F1 of the aircraft F. This distance is designated as "(L1)/3" in FIG. 1.

The front or rear side F4-1 or F4-2 of the wingbox F4 is understood in this context as the front side of the cross-member located furthest to the front when viewed in the longitudinal direction X of the aircraft and extending transversely to the fuselage F3, i.e., along the Y-direction. A cross-member in turn is understood in this context to be a supporting member of the wingbox.

The trailing edge lift system HAS2 represented in FIG. 2 comprises:
two trailing edge lift bodies or landing flaps per wing (not shown in the representation of FIG. 1), with an inner landing flap A1 and an outer landing flap A2 each arranged on a first wing 10a so as to be adjustable relative to the latter, and an inner landing flap B1 and an outer landing flap B2 each arranged on a second wing 10b so as to be adjustable relative to the latter;
an adjusting mechanism 200 mechanically coupled with the trailing edge lift bodies for adjusting them;
a trailing edge lift system drive device 210 coupled with the adjusting mechanism 200 for actuating the adjusting mechanism 200 on the basis of received adjustment commands;
a trailing edge lift system activation device 220 containing an activation function which generates adjustment commands for adjusting the trailing edge lift bodies A1, A2, B1, B2 on the basis of inputs and particularly of target commands and transmits them to the trailing edge lift system drive device 210 for actuating the adjusting mechanism 200.

In the high lift system of the invention there is generally also a possibility of only one or more than two trailing edge lift bodies or landing flaps per wing being provided.

In FIG. 2 the trailing edge lift bodies C1, C2 of the left wing 10a are also conformingly provided with reference symbol C, and the trailing edge lift bodies D1, D2 of the right wing 10b are also conformingly provided with reference symbol D.

The activation device 220 of the trailing edge lift system HAS2 may be implemented to be multiple redundant to enhance the degree of fail-safe operation. For this purpose, two specimens 221, 222 of an activation device 220 may be provided in accordance with the representation in FIG. 2, which are identical in a certain regard or entirely identical and are connected to each other into a whole via a data connection for mutual monitoring and optional for reconfiguration of the activation device 220.

In accordance with the invention, the activation device 220 of the trailing edge lift system HAS2 is generally installed in the payload area of the aircraft's fuselage F3 and in an area L3 which extends, when viewed in the longitudinal direction X, from a location which is spaced apart from the front side F4-1 of the wingbox F4 by a distance of one third of the fuselage length L1 extending from there to the tip F1 of the aircraft in a direction toward the front tip F1 of the aircraft F, as far as a location which is spaced apart from the rear side F4-2 of the wingbox F4 by a distance of one third of the fuselage length L2 extending from there to the fuselage end F2 at the tail end of the aircraft F in a direction toward the fuselage end F2 at the tail end of the aircraft 1. The installation area thus resulting in the longitudinal direction X is entered in FIG. 1 with the designation of length L3.

According to a special practical example of the invention, the activation device 220 of the trailing edge lift system HAS2 is installed in the payload area and in an area of the aircraft's fuselage F3 extending from the rear side F4-2 of the wingbox F4 as far as a location which is spaced apart from the rear side F4-2 of the wingbox F4 by a distance of one third of the fuselage length L2 extending from there to the fuselage end F2 at the tail end of the aircraft F in a direction toward the fuselage end F2 at the tail end of the aircraft. In FIG. 1 this distance is designated by "(L2)/3."

The high lift system HAS is actuated and checked by means of the pilot interface which comprises in particular the input device 55 for inputting target commands for adjusting the high lift bodies such as, e.g., an actuating lever. In accordance with the invention the input device is connected via a digital data connection to the activation device for the transmission of target commands for adjusting the high lift bodies 14a, 14b.

In the practical example represented in FIG. 2, the data bus of the aircraft system is represented with reference symbol DB. The input device 55 comprises position sensors which detect the position of the input device 55. Moreover the input device 55 comprises an A/D converter which converts the signals detected by the input device 55 into digital data and transmits them via a corresponding interface to the data bus DB.

To the data bus DB the activation devices 120, 220 of the leading edge lift system HAS1 and of the trailing edge lift system HAS2 are associated, so that hereby the actuation positions of the input device 55 that were determined by the corresponding position sensors and transmitted via the A/D converter to the data bus DB are transmitted, in accordance with the data protocol of the data bus DB, to the activation device 120 of the leading edge lift system HAS1 and the activation device 220 of the trailing edge lift system HAS2.

Figure 3:
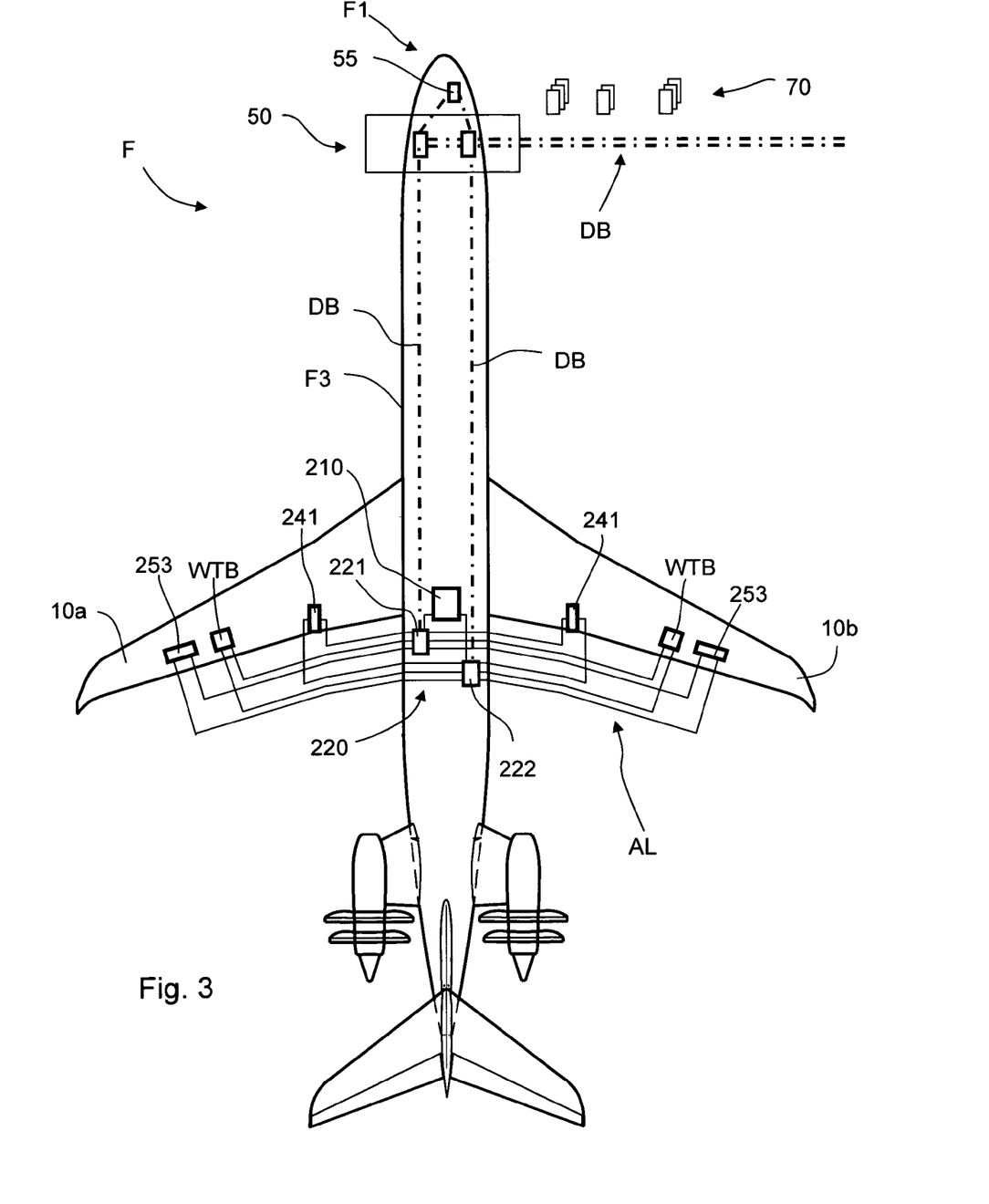
FIG. 3 is a schematic representation of signal transmission lines of a practical example of the aircraft of the invention comprising a trailing edge lift system.
Figure 4:
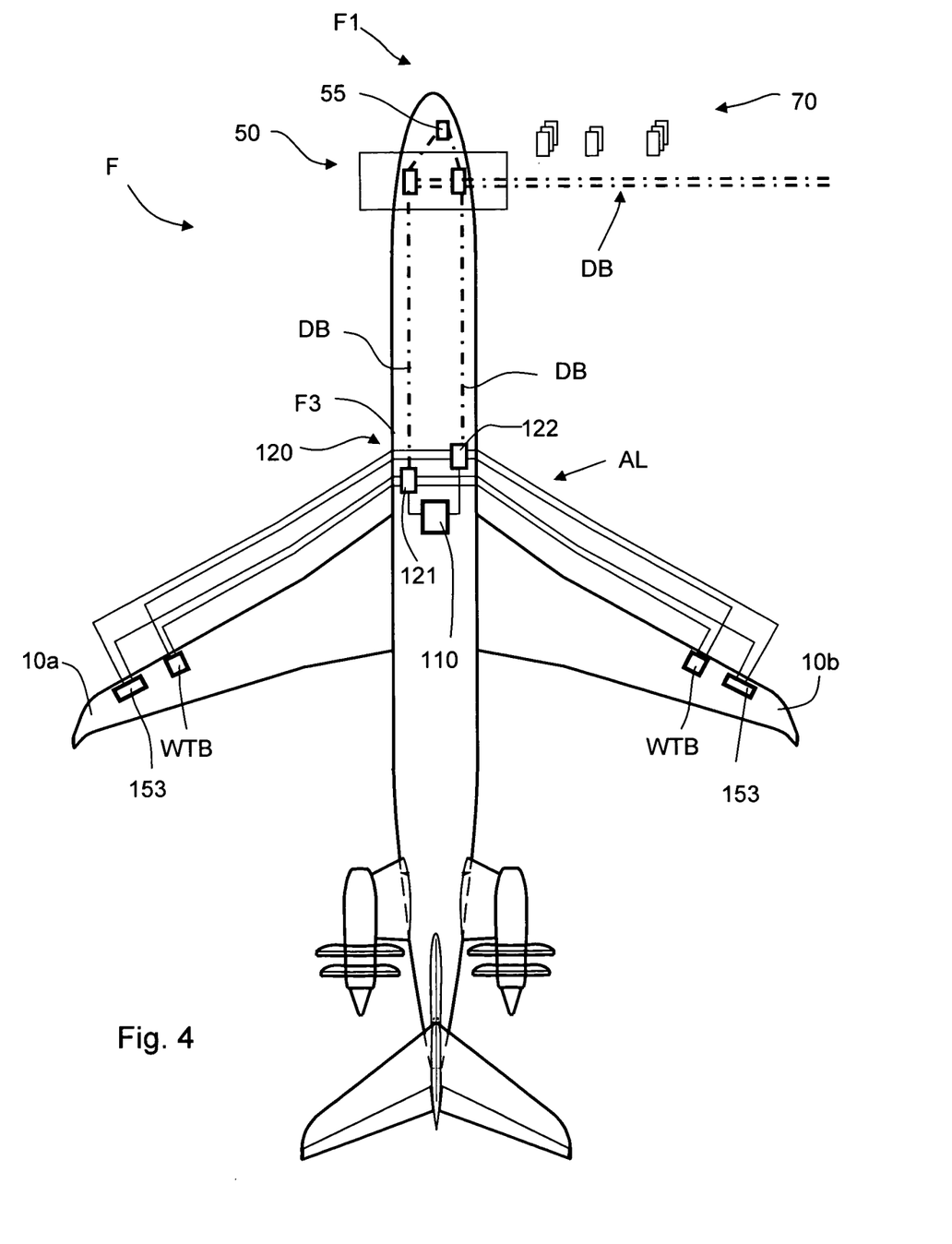
FIG. 4 is a schematic representation of signal transmission lines of a practical example of the aircraft of the invention comprising a leading edge lift system.

As an alternative for the practical example represented in FIG. 2, it may be provided in accordance with the invention that the high lift system HAS comprises only a leading edge lift system HAS1 but no trailing edge lift system HAS2 or only a trailing edge lift system HAS2 but no leading edge lift system HAS1, as is represented in FIGS. 3 and 4, respectively. In these cases the input device 55 is functionally connected to the activation device 120 of the leading edge lift system HAS1 or to the activation device 220 of the trailing edge lift system HAS2, as is represented in FIGS. 3 and 4, respectively.

As an alternative for the practical example represented in FIG. 2 it may furthermore be provided in accordance with the invention that the activation device 120 of the leading edge lift system HAS1 and the activation device 220 of the trailing edge lift system HAS2 are integrated jointly into one activation device in an activation unit or activation computer arrangement 320, as is represented in FIG. 1. The latter may also be implemented to be multiple redundant and monitor each other to enhance the degree of fail-safe operation.

In supplementation of the representation of FIG. 2 showing mechanical components or constituent parts of a practical example of a high lift system in accordance with the invention, FIGS. 4 and 5 show a schematic representation of a practical example of the aircraft of the invention comprising a trailing edge lift system HAS1 or a leading edge lift system HAS2, respectively. In these representations, function modules of the respective high lift system, function modules of the aircraft system, and associated ones of signal transmission lines are shown, wherein single function modules and signal transmission lines are drawn in outside the aircraft's contour for the purpose of clarity of representation. In FIGS. 3 and 4, components or modules or constituent parts of the respective high lift system are provided with the reference symbols used in FIGS. 1 and 2 where these are components or modules or constituent parts having a same or similar function.

One practical example of the leading edge lift system HAS1 and of the trailing edge lift system HAS2, which is represented by way of example in FIG. 2, is described in the following with its further constituent parts, wherein the same reference symbols are used for constituent parts or components generally having a same function:

The drive devices 110 bzw. 210 may each comprise two drive motors M1, M2 for actuating the adjusting mechanisms 100 and 200, as well as braking devices B1, B2 associated to the latter for locking the respective high lift system HAS, HAS1, HAS2. Moreover the drive devices 110 and 210 may comprise a differential. The differential is coupled with the output sides of the hydraulic motor M1 and of the electric motor M2 such that the respective power outputs furnished by the hydraulic motor H and the electric motor are added to each other and transmitted to rotary drive shafts 111, 112 and 211, 212. The braking devices B1, B2 may be actuated by a command signal of the respective associated activation device 110 or 210.

One respective adjusting mechanism 100 or 200 for adjusting the respective associated lift bodies A, B or C, D and in the shown practical example altogether two rotary drive shafts 111, 112 or 211, 212 each for actuating the at least one flap of the leading edge lift system or of the trailing edge lift system per wing are coupled to the drive devices 110, 210. The two rotary drive shafts 111, 112 and 211, 212 are coupled to the respective drive device 110 or 210 and are thereby synchronized with each other. On the basis of corresponding control commands the drive device 110 or 210 causes the rotary drive shafts 111, 112 or 211, 212 to rotate in order to perform actuating movements of the adjusting devices coupled to them of the respective flap. A torque limiter T may be integrated in a shaft portion of the rotary drive shafts 111, 112 and 211, 212 situated close to the drive device 110 or 210.

In the high lift system represented in FIG. 2, two respective adjusting devices VA and VB are arranged on each lift body A, A1, A2, A3, A4 and B, B1, B2, B3, B4 of the leading edge lift system HAS1. Moreover two respective adjusting devices VC and VD are arranged on each lift body C1, C2 and D1, D2 of the trailing edge lift system HAS2, namely in detail, e.g., the adjusting devices VC at the inner lift bodies C1 and D1, and the adjusting devices VD at the outer lift bodies C2 and D2.

In the following, the adjusting devices are described by referring to a practical example thereof, wherein the constituent parts of each adjusting device are equipped with a same function:

Each one of the adjusting devices VA, VB and VC, VD comprises a gear transmission 150 or 250 and an adjustment kinematics system 121 or 221. The gear transmissions 120 and 220 are mechanically coupled to the respective rotary drive shafts 111, 112 or 211, 212 and convert a rotational movement of the respective rotary drive shafts 111, 112 or 211, 212 into an adjusting movement of the flap area coupled to the respective adjusting device. According to one practical example of the invention, the adjusting mechanism(s) 100 and/or 200 may comprise at least one position sensor which determines the adjustment position of the adjusting mechanisms 100 and/or 200 and thus the current position of the respective flap and sends this position value via a line (not represented) to the control and monitoring device 5 for checking the condition of the respective high lift system.

For example, at the ends of the rotary shaft drive trains 111, 112 and 211, 212 a respective asymmetry sensor 153 or 253 may be arranged which also is functionally connected via a signal line to the activation device 120 or 220 and sends via this line to the activation device 110 or 210 a current value which indicates whether the ends of the rotary shaft drive trains 111, 112 and 211, 212 are being rotated within a predetermined range or whether an asymmetrical rotary position of the rotary drive shafts 111, 112 and 211, 212 exists.

Where at least two high lift bodies of the leading edge lift system HAS1 or of the trailing edge lift system HAS2 are provided on a wing, connection struts 240 (drawn only in the trailing edge lift system of FIGS. 2 and 3) having a connection strut sensor 241 arranged thereon may be provided between respective adjacent lift bodies. The connection strut sensor 241 is functionally connected to the respective activation device 120 or 220 and may particularly be realized for measuring an end position, wherein, if a predetermined limit value is exceeded, the respective activation device 120 or 220 attributes a fault to the lift body adjusting mechanism 100, 200 on the one wing side on which the limit value was detected to have been exceeded.

Moreover in one location of the rotary drive shafts 111, 112 and 211, 212 situated in an outer area of the respective wing, a respective wing-end area brake WTB is arranged which upon actuation is capable of locking the respective drive train 111, 112 or 211, 212. Each of the wing-end area brakes WTB is functionally connected via a line (also not represented) to the activation device 120 or 220 and may be activated and actuated via this line by the activation device 120 or 220. In operation, the normal starting state of the wing-end area brake WTB is a non-actuation state in which they do not interfere with the rotation of the rotary drive shafts 111, 112 and 211, 212. Upon a corresponding control signal from the activation device 120 or 220 the wing-end area brakes WTB may be actuated so as to lock the respective associated rotary drive shaft 111, 112 or 211, 212.

Both braking devices B1, B2 of the respective drive device 110, 210 are functionally connected to the respective activation device 120 or 220, which is capable under predetermined conditions of actuating the braking devices B1, B2 and thus lock the rotary shaft drive trains 111, 112 and 211, 212. In one practical example it is provided that in case one of the two drive motors—the hydraulic motor M1 or the electric motor M2—is deactivated, the activation device 120 or 220 provides a power output that is reduced by the amount of the deactivated motor due to the differential which is configured such that the respective output powers furnished by the hydraulic motor M1 and the electric motor M2 are added to each other.

Mechanical faults in the lift body actuation mechanisms or lift body adjusting mechanisms 100, 200 such as, e.g., jamming of a constituent part of a flap actuating mechanism or of the rotary shaft drive trains 111, 112 or 211, 212 or a breakage of a rotary drive shaft of a rotary shaft drive train 111, 112 or 211, 212 may result in an undesirable comportment of the device such as, e.g., asymmetric actuation of the flap elements, which is detected by the activation device 120 or 220 by means of the signals transmitted by the asymmetry sensors 153 and 253. Subsequently the activation device 120 or 220 sends a deactivation signal to the wing-end area brake WTB so as to actuate the wing-end area brakes WTB and lock the rotary drive shafts 111, 112 or 211, 212.

In the event of an inadmissible deviation of the target positions determined by the activation device 120 or 220 from the actual positions detected by means of the position sensors, the activation device 120 or 220 sends an actuation signal to the wing-end area brake WTB as well as to the braking devices B1, B2 so as to lock both shaft trains 111, 112 and 211, 212.

The sensors that are provided for monitoring the respective leading edge lift system HAS1 or trailing edge lift system HAS2, i.e. the respective position sensor, the respective asymmetry sensor 153 or 253 and in a given case the respective connection strut sensor 241, are functionally connected to the respective activation device 120, 220 for supplying their sensor signals to the respective associated activation device 120 or 220 via analog lines AL, i.e., electric lines which transmit analog signals. Likewise, the components to be activated by the respective associated activation device 120 or 220, such as particularly the wing-end area brakes WTB or the motor M1 or the motor M2, are functionally connected, for commanding the latter, to the respective associated activation device 120 or 220 via analog lines AL (FIGS. 3 and 4).

The described transmission of data via the data bus DB may in particular take place via a digital data collection and distribution point.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An aircraft having a high lift system, comprising:
   a flight control computer installed in a cockpit of the aircraft;
   at least one high lift body disposed on each respective wing of the aircraft, each high lift body being adjustable relative to the respective aircraft wing;
   a drive device coupled with the high lift bodies, which is configured such that it adjusts the high lift bodies between a retracted position and an extended position on the basis of activation commands;
   an activation device connected to the drive device via an analog data connection and including an activation function that generates activation commands for setting an adjustment state of the high lift bodies and that generates monitoring and locking commands for locking the high lift bodies in the event of a system failure, wherein the activation device is connected via a digital data connection to the flight control computer for receiving flight state-related data;
   an input device arranged in the cockpit of the aircraft, the input device receiving input of target commands for adjusting the high lift bodies;
   sensors configured to detect an adjustment state of the high lift bodies which are connected via analog signal lines to the activation device; and
   wherein
   the input device is connected via a digital data connection to the activation device for the transmission of target commands for adjusting the high lift bodies; and
   the activation device of the high lift system is installed in a payload area of the aircraft's fuselage and in an area extending, when viewed in a longitudinal direction of the aircraft's fuselage, from a location which is spaced apart from a front side of a wingbox by a distance of one third of a fuselage length extending from the front side of the wingbox to a tip of the aircraft, as far as a location which is spaced apart from a rear side of the wingbox by a distance of one third of a fuselage length extending from the rear side of the wingbox to a fuselage end at a tail end of the aircraft, such that the flight control computer and the activation device are installed in separate areas of the aircraft's fuselage in a decentralized arrangement.

2. The aircraft according to claim 1, wherein the high lift system is a leading edge lift system having adjustable leading edge lift bodies and an activation device, wherein the activation device of the leading edge lift system is functionally connected to the leading edge lift bodies for adjusting them.

3. The aircraft according to claim 2, wherein the activation device of the leading edge lift system is installed in the payload area of the aircraft's fuselage and in an area extending from the front side of the wingbox to a location which is spaced apart from the front side of the wingbox by a distance of one third of the fuselage length extending from the front side of the wingbox to the tip of the aircraft.

4. The aircraft according to claim 1, wherein the high lift system is a trailing edge lift system having adjustable trailing edge lift bodies and an activation device, wherein the activation device of the trailing edge lift system is functionally connected to the trailing edge lift bodies for adjusting them.

5. The aircraft according to claim 4, wherein the activation device of the trailing edge lift system is installed in the payload area of the aircraft's fuselage and in an area extending from the rear side of the wingbox to a location which is spaced apart from the rear side of the wingbox by a distance of one third of the fuselage length extending from the rear side of the wingbox to the end of the fuselage at the tail end of the aircraft.

6. The aircraft according to claim 1, wherein the at least one activation device(s) are formed of respective computers and hardware interfaces which are implemented in their hardware so as to be identical, in order to ensure an exchangeability of computers with hardware interfaces between activation devices and/or within activation devices.

7. The aircraft according to claim 1, wherein the aircraft is a rear-drive aircraft.

* * * * *